US012480490B2

(12) United States Patent
Chuan

(10) Patent No.: US 12,480,490 B2

(45) Date of Patent: Nov. 25, 2025

(54) AUTOMATIC OIL RETURN STRUCTURE

(71) Applicant: KUDOS MECHANICAL CO., LTD., New Taipei (TW)

(72) Inventor: James Chuan, New Taipei (TW)

(73) Assignee: KUDOS MECHANICAL CO., LTD., New Taipei (TW)

( * ) Notice: Subject to any disclaimer, the term of this patent is extended or adjusted under 35 U.S.C. 154(b) by 252 days.

(21) Appl. No.: 18/448,884

(22) Filed: Aug. 11, 2023

(65) Prior Publication Data

US 2025/0043780 A1 Feb. 6, 2025

(30) Foreign Application Priority Data

Aug. 1, 2023 (TW) ................................ 112128793

(51) Int. Cl.

*F04B 53/18* (2006.01)
*F15B 1/26* (2006.01)
*F15B 13/02* (2006.01)

(52) U.S. Cl.

CPC ................ *F04B 53/18* (2013.01); *F15B 1/26* (2013.01); *F15B 13/02* (2013.01)

(58) Field of Classification Search

None

See application file for complete search history.

(56) References Cited

U.S. PATENT DOCUMENTS

| | | | | |
|---|---|---|---|---|
| 5,125,324 | A * | 6/1992 | Araki | B25B 7/126 269/238 |
| 6,276,186 | B1 * | 8/2001 | Frenken | B25F 5/005 29/751 |
| 10,774,628 | B2 | 9/2020 | Knoeller | |
| 10,962,034 | B1 * | 3/2021 | Chuan | B25B 27/10 |
| 2001/0027676 | A1 * | 10/2001 | Frenken | B25F 5/005 72/453.15 |

(Continued)

FOREIGN PATENT DOCUMENTS

| | | | |
|---|---|---|---|
| CN | 215292856 | U | 12/2021 |
| DE | 102020112217 | A1 | 5/2021 |

(Continued)

*Primary Examiner* — Dominick L Plakkoottam
*Assistant Examiner* — Geoffrey S Lee
(74) *Attorney, Agent, or Firm* — METIS IP LLC

(57) ABSTRACT

The automatic oil return structure includes a piston assembly and a main body assembly. The piston assembly comprises an inner tube, an outer tube, and a displacement unit. The main body assembly comprises a first main section fluidly communicating with an oil storage container, a controlling assembly, an operating plug, and a switch channel fluidly communicating with the first main section, a pressurization channel, and an oil returning channel. When the pressure of the first main section achieves a maximum pressure, the pressure pushes the controlling assembly and the operating plug, and the oil storage container fluidly communicates with the first main section, lowering the pressure of the first main section. A switch assembly is moved to isolate the switch channel from the first main section, such that the switch channel fluidly communicates with the oil returning channel and the hydraulic oil keeps returning to the oil storage container.

10 Claims, 21 Drawing Sheets

(56) References Cited

U.S. PATENT DOCUMENTS

| | | | | |
|---|---|---|---|---|
| 2010/0300308 | A1* | 12/2010 | Frenken | B30B 15/16 100/35 |
| 2017/0356472 | A1* | 12/2017 | Ballard | B23D 29/002 |
| 2019/0232481 | A1* | 8/2019 | Skinner | B25B 27/10 |

FOREIGN PATENT DOCUMENTS

| | | | |
|---|---|---|---|
| DE | 102022131012 | B3 | 2/2024 |
| DE | 102023122022 | A1 | 2/2024 |
| TW | M635095 | U | 12/2022 |
| TW | M635437 | U | 12/2022 |
| WO | 2014063182 | A1 | 5/2014 |

* cited by examiner

AUTOMATIC OIL RETURN STRUCTURE

CROSS-REFERENCE TO RELATED APPLICATIONS

This application claims priority to TAIWAN Patent Application No. 112128793, filed on Aug. 1, 2023, the contents of each of which are hereby incorporated by reference.

TECHNICAL FIELD

The present invention relates to a piston pump, especially to a piston pump that is configured to be installed in a clamping tool.

BACKGROUND OF THE INVENTION

The conventional piston pump includes an oil storage container, a driving assembly, and a piston. The driving assembly pumps out the hydraulic oil that is in the oil storage container, and then pressurizes the hydraulic oil to pump the hydraulic oil into the piston to push the piston to move. In order to push the piston to a working position quickly, and to control and tune the piston precisely when the piston is approaching the working position, the piston is pushed via an inner tube and an outer tube.

When the piston pump is just actuated, the driving assembly pumps the hydraulic oil into the inner tube to push the piston quickly. Due to a shorter diameter of the inner tube, the inner tube may be pushed for a long distance by the hydraulic oil in a small amount, and thereby the piston can be pushed quickly. As long as the piston approaches the working position, the driving assembly pumps the hydraulic oil into both the inner tube and the outer tube, therefore, a moving speed of the piston can be controlled and tuned precisely.

As long as the piston abuts an object to be compressed along with the constant moving of the piston, the pressures of the inner tube and the outer tube rise and gain with the increasing compression exerted on the object by the piston. A safety valve would be pushed to open when the pressure rises to a preset value, which means a required compression has been done by the piston, and the hydraulic oil in the inner tube and the outer tube flows back to the oil storage container via a safety channel.

However, once the safety valve opens, the pressure would lower down to zero instantaneously. Therefore, the safety valve can be only opened at an instant moment, and the safety valve would soon close again as long as the pressure lowers down to zero. Hence, only little amount of the hydraulic oil can return back to the oil storage container via the safety valve from the safety channel. In this case, the user needs to further press an oil relief lever to open an oil returning channel, and the user has to constantly press the oil relief lever until all of the hydraulic oil in the inner tube and the outer tube returns to the oil storage container from the oil returning channel. Therefore, the hydraulic oil flows back to the oil storage container from the piston. However, the aforementioned operation process is extremely inconvenient.

To overcome the shortcomings, the present invention provides an automatic oil return structure to mitigate or obviate the aforementioned problems.

SUMMARY

The main objective of the present invention is to provide an automatic oil return structure that is configured to be installed in a piston pump which has an inner tube and an outer tube, and is capable of returning all of the hydraulic oil back to an oil storage container as long as a pressure of the hydraulic oil is higher than a preset value.

The automatic oil return structure has an oil storage container, a piston assembly, and a main body assembly.

The oil storage container contains hydraulic oil inside, the hydraulic oil in the oil storage container keeps at a static pressure.

The piston assembly is disposed spaced apart from the oil storage container. The piston assembly has an inner tube, a displacement unit, a first oil reservoir, an outer tube, and a second oil reservoir. The inner tube has an inner channel. The displacement unit is sleeved on the inner tube, and the displacement unit is sealed on an outer wall surface of the inner tube. The first oil reservoir is formed within the displacement unit and fluidly communicates with the inner channel. The outer tube is sleeved on the displacement unit. The displacement unit is sealed on an inner wall surface of the outer tube, and the displacement unit is capable of moving with respect to the inner tube and the outer tube. The second oil reservoir is formed among the outer tube, the inner tube, and the displacement unit.

The main body assembly is disposed between the oil storage container and the piston assembly. The main body assembly comprises a first main section, a second main section, a first one-way blocking assembly, a second one-way blocking assembly, a switch channel, a switch assembly, a pressurization channel, an oil returning channel, a controlling channel, a controlling assembly, an operating channel, a first operating plug, and a second operating plug. The first main section fluidly communicates with the oil storage container. The second main section fluidly communicates with the first oil reservoir and the second oil reservoir. The first one-way blocking assembly is capable of preventing the hydraulic oil from flowing from the first main section to the oil storage container. The second one-way blocking assembly is capable of preventing the hydraulic oil from flowing from the second main section to the second oil reservoir. The switch channel fluidly communicates with the first main section. The switch assembly is mounted in the switch channel and selectively blocks the switch channel. The pressurization channel has an end fluidly communicating with the switch channel and another end fluidly communicating with the first oil reservoir. The oil returning channel has an end fluidly communicating with the switch channel and another end fluidly communicating with the oil storage container. The controlling channel fluidly communicates with the first main section. The controlling assembly is mounted in the controlling channel and selectively blocks the controlling channel. The operating channel has a first operating section and a second operating section, an end of the first operating section fluidly communicates with the controlling channel, and another end of the first operating section fluidly communicates with the oil storage container and the second operating section. The first operating plug is movably mounted in the first operating section of the operating channel, positions where the controlling channel fluidly communicates with the first operating section and where the oil storage container fluidly communicates with the first operating section are disposed at two respective sides of the first operating plug. The second operating plug is mounted in the operating channel and selectively isolates the first operating section from the second operating section.

Wherein, when a pressure of the first main section is higher than a starting pressure, the pressure of the first main section drives the switch assembly to move and isolate the switch channel from the oil returning channel, and the switch channel keeps fluidly communicating with the first main section and the pressurization channel, and thus the hydraulic oil flows into the first oil reservoir via the inner channel; the starting pressure is higher than the static pressure.

When the pressure of the first main section achieves a maximum pressure, the pressure of the first main section pushes the controlling assembly, and thus the first main section fluidly communicates with the first operating section; the pressure of the first main section also drives the first operating plug to push the second operating plug to move, and thus the second operating section fluidly communicates with the first operating section and the oil storage container; when the second operating section fluidly communicates with the oil storage container, the pressure of the first main section lowers down to the static pressure; the maximum pressure is higher than the starting pressure.

When the pressure of the first main section lowers down to the static pressure, the switch assembly moves and isolates the switch channel from the first main section, and the switch channel keeps fluidly communicating with the pressurization channel and the oil returning channel, and then the hydraulic oil passes by the inner channel, the pressurization channel, and the oil returning channel from the first oil reservoir to the oil storage container; the hydraulic oil in the second oil reservoir pushes the second one-way blocking assembly and enters the second main section, and the hydraulic oil flows toward the oil storage container via the pressurization channel and the oil returning channel.

Therefore, when the pressure of the first main section achieves the maximum pressure, the pressure pushes the controlling assembly and the operating plug, thereby the oil storage container, the first operating section, the second operating section, and the first main section are in fluid communication, and the pressure of the first main section lowers down. Meanwhile, the switch assembly moves to isolate the switch channel and the first main section, and makes the switch channel fluidly communicate with the oil returning channel, therefore, the first oil reservoir and the second oil reservoir are capable of keeping fluidly communicating with the oil storage container to lower down the pressure and return the hydraulic oil.

Other objectives, advantages and novel features of the invention will become more apparent from the following detailed description when taken in conjunction with the accompanying drawings.

DETAILED DESCRIPTION OF THE INVENTION

Figure 1:
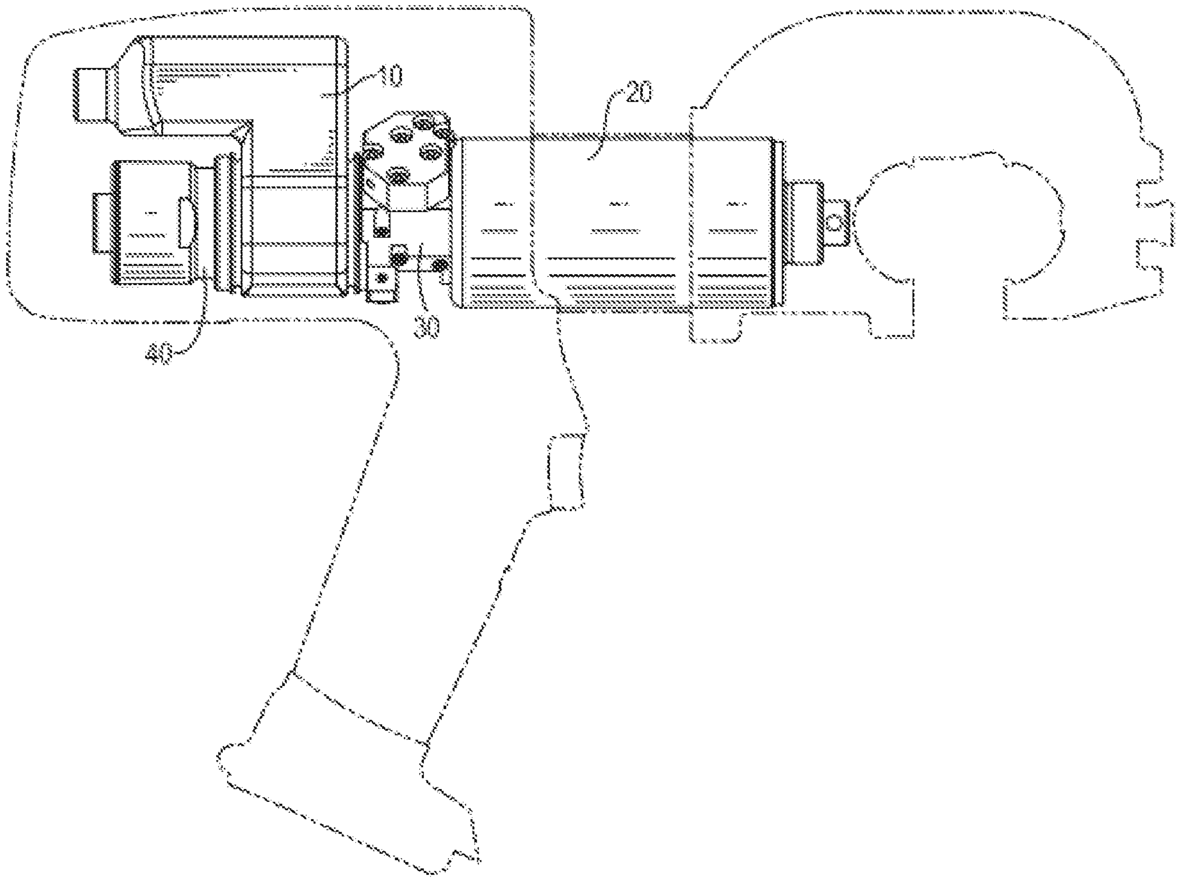
FIG. 1 is a side view of an automatic oil return structure in accordance with the present invention, shown mounted in a piston pump.

With reference to FIG. 1, an automatic oil return structure in accordance with the present invention includes an oil storage container 10, a piston assembly 20, a main body assembly 30, and a driving assembly 40. The piston assembly 20 is disposed spaced from the oil storage container 10, and the main body assembly 30 is disposed between the piston assembly 20 and the oil storage container 10. The driving assembly 40 is connected to the main body assembly 30. The driving assembly 40 drives the hydraulic oil in the oil storage container 10 to flow through the main body assembly 30 and then be pushed to the piston assembly 20.

The hydraulic oil is stored in the oil storage container 10, and the hydraulic oil in the oil storage container 10 keeps at a static pressure. When ducts of the automatic oil return structure in this disclosure fluidly communicate with the oil storage container 10, the hydraulic oil in the ducts would also achieve the static pressure because of a much large volume of the oil storage container 10.

Figure 2:
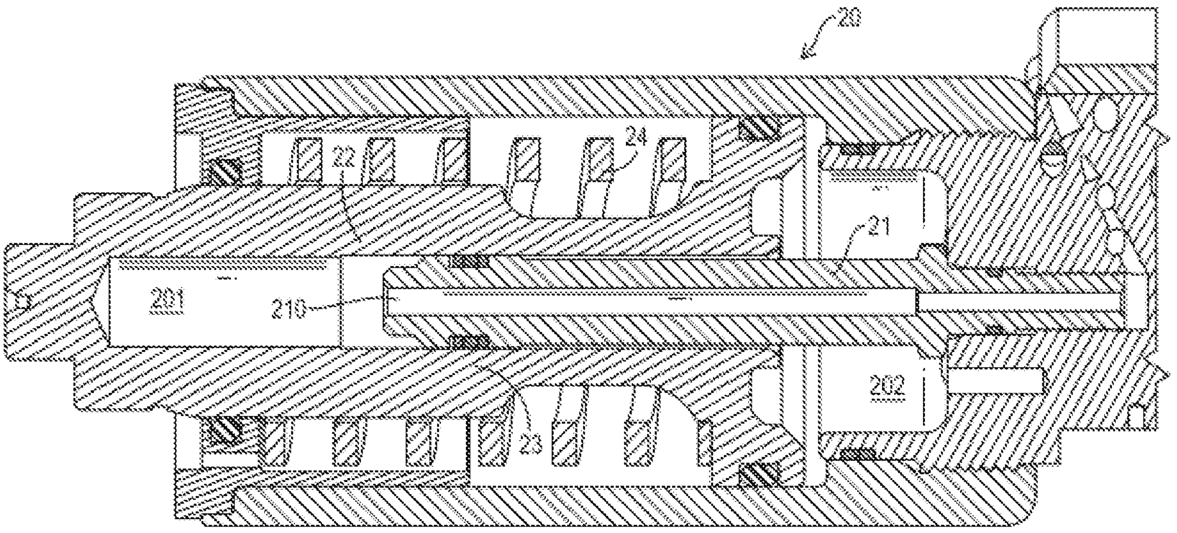
FIG. 2 is a cross-sectional view of the automatic oil return structure taken across line 2-2 in FIG. 15, showing a cross section of a piston assembly.
Figure 15:
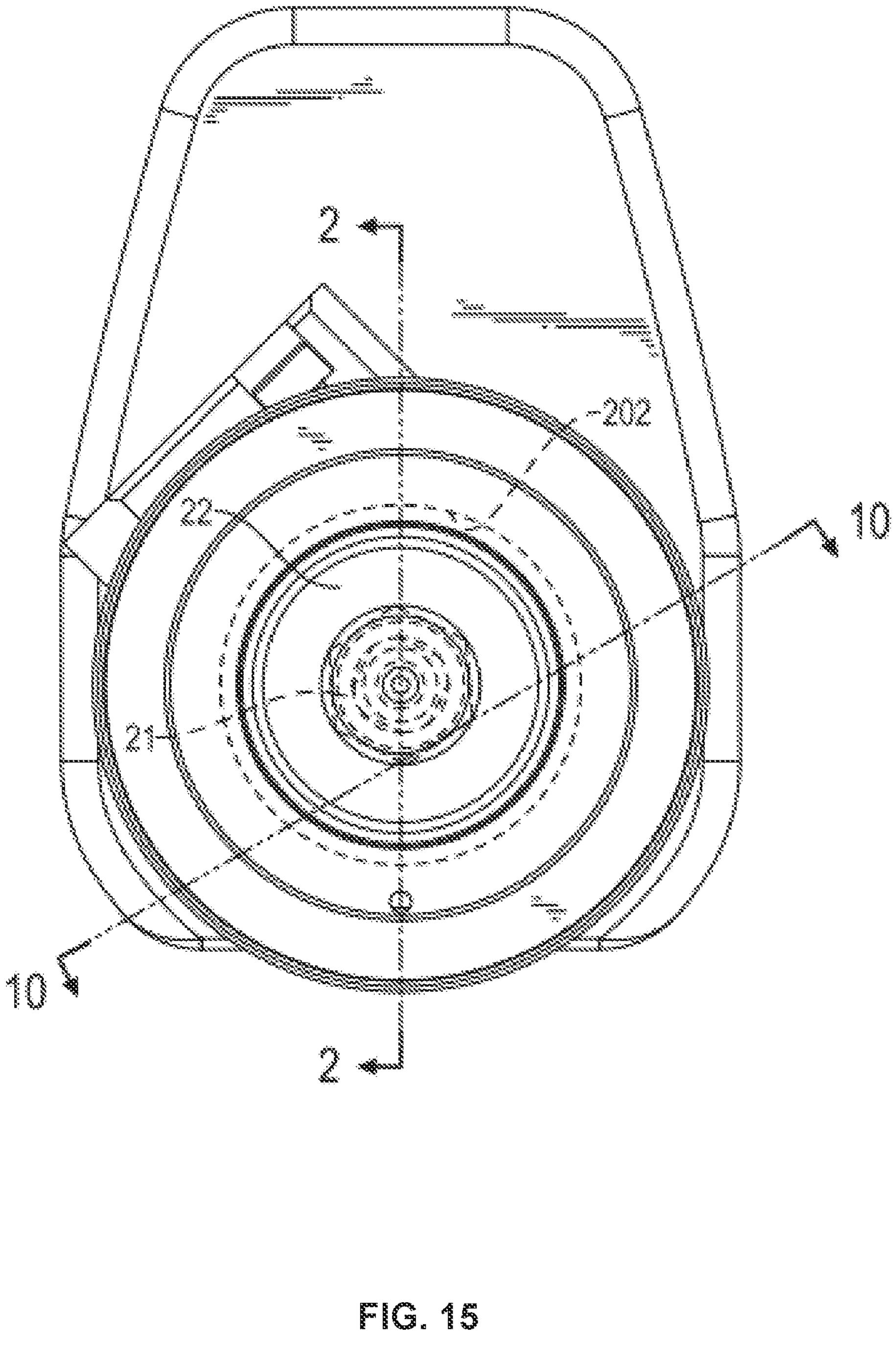
FIG. 15 is a front view of the automatic oil return structure in FIG. 1.

With reference to FIG. 2 and FIG. 15, the piston assembly 20 has an inner tube 21, a displacement unit 22, and an outer tube 23, and a first oil reservoir 201 and a second oil reservoir 202 are formed in the piston assembly 20. The piston assembly 20 may selectively have a returning elastic unit 24. The inner tube 21 has an inner channel 210. The displacement unit 22 is sleeved on the inner tube 21 and seals an outer wall surface of the inner tube 21. The outer tube 23 is sleeved on the displacement unit 22, and the displacement unit 22 seals an inner wall of the outer tube 23. The displacement unit 22 is capable of moving with respect to the inner tube 21 and the outer tube 23. The first oil reservoir 201 is formed in the displacement unit 22 and fluidly communicates with the inner channel 210, and the second oil reservoir 202 is formed among the outer tube 23, the inner tube 21, and displacement unit 22. Volumes of the first oil reservoir 201 and the second oil reservoir 202 change along with moving of the displacement unit 22. The returning elastic unit 24 is configured to restore the displacement unit 22. To be more precise, the returning elastic unit 24 restores the displacement unit 22 to a position where the volumes of the first oil reservoir 201 and the second oil reservoir 202 are at a minimum.

Figure 3:
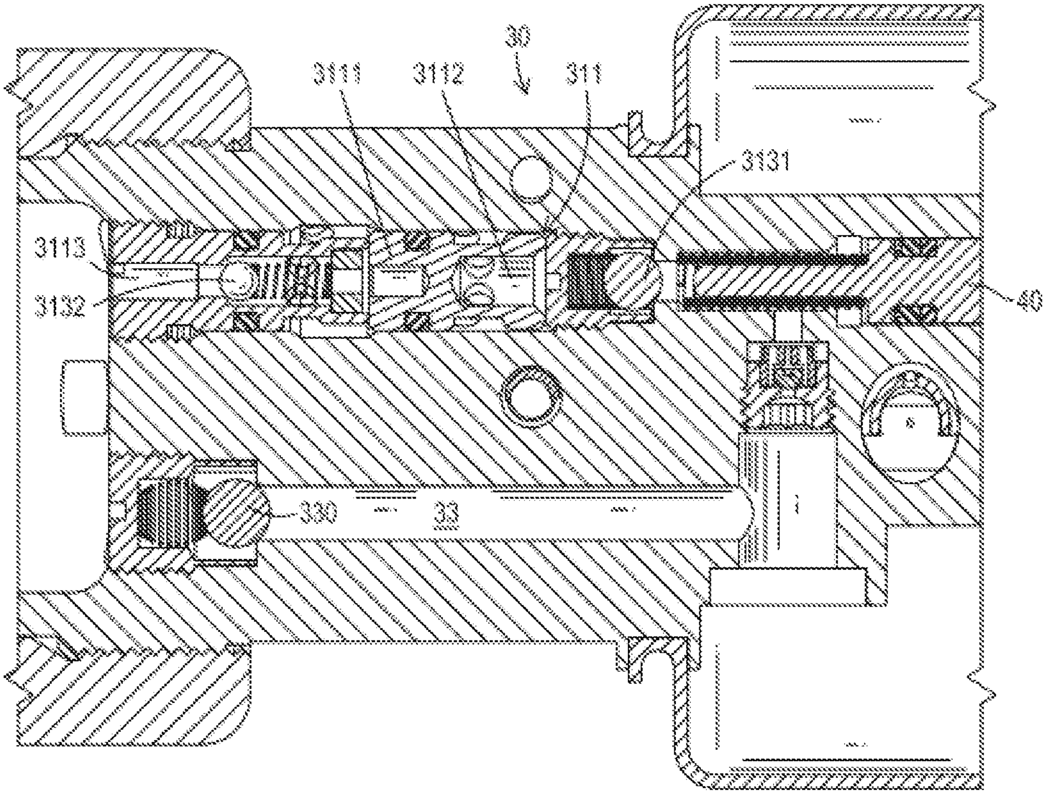
FIG. 3 is a cross-sectional view of the automatic oil return structure taken across line 3-3 in FIG. 16, showing a cross section of a first primary channel.
Figure 4:
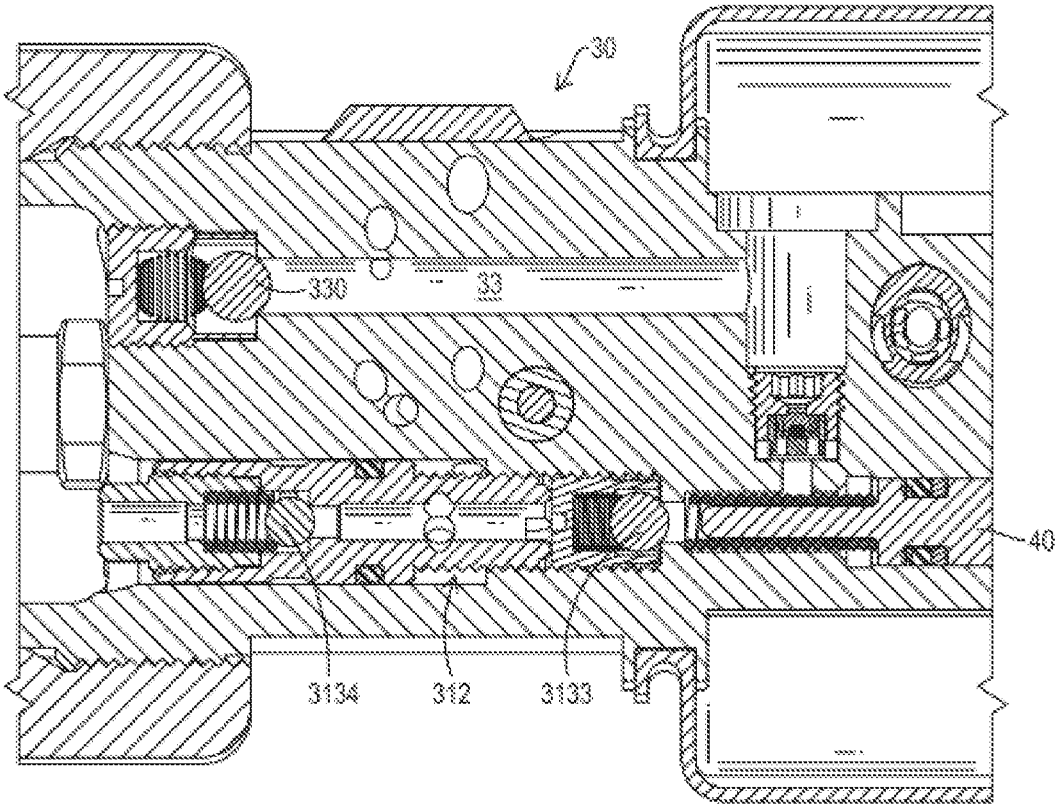
FIG. 4 is a cross-sectional view of the automatic oil return structure taken across line 4-4 in FIG. 16, showing a cross section of a second primary channel.
Figure 5:
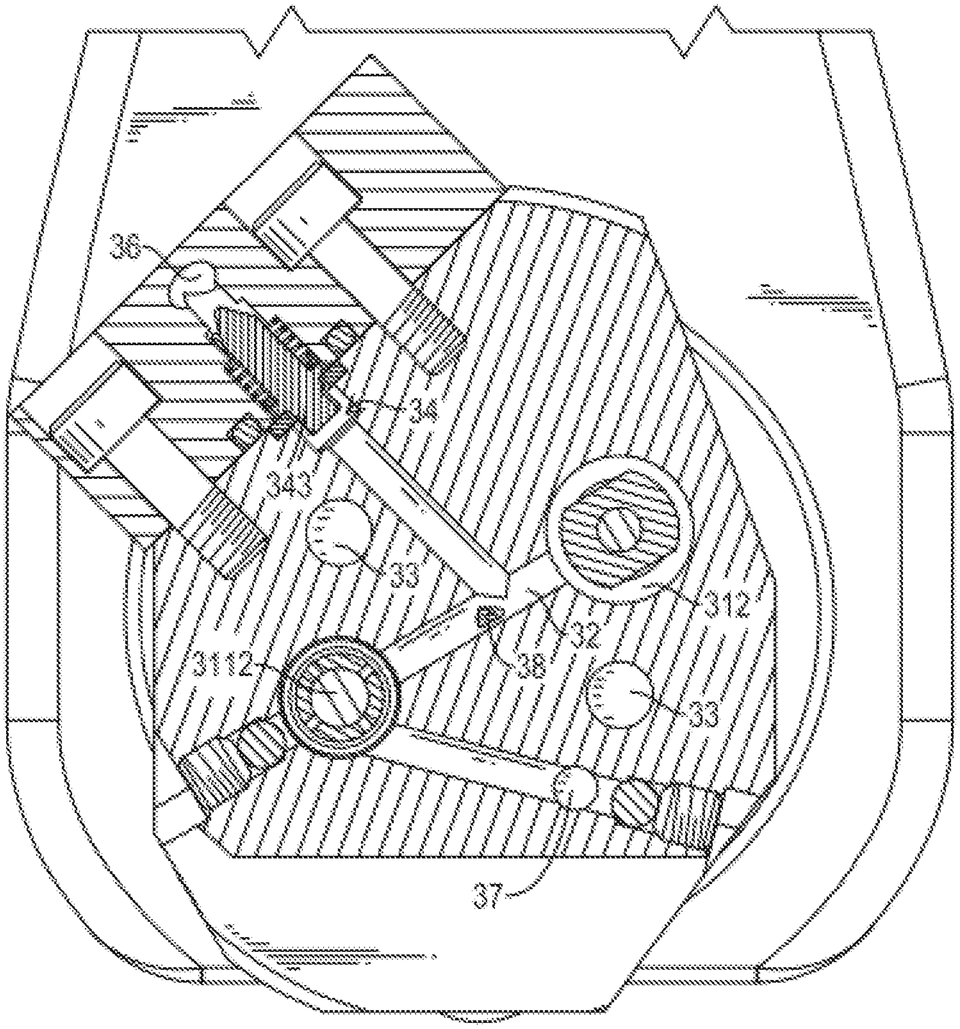
FIG. 5 is a cross-sectional view of the automatic oil return structure taken across line 5-5 in FIG. 16, showing a cross section of a communicating channel.
Figure 9:
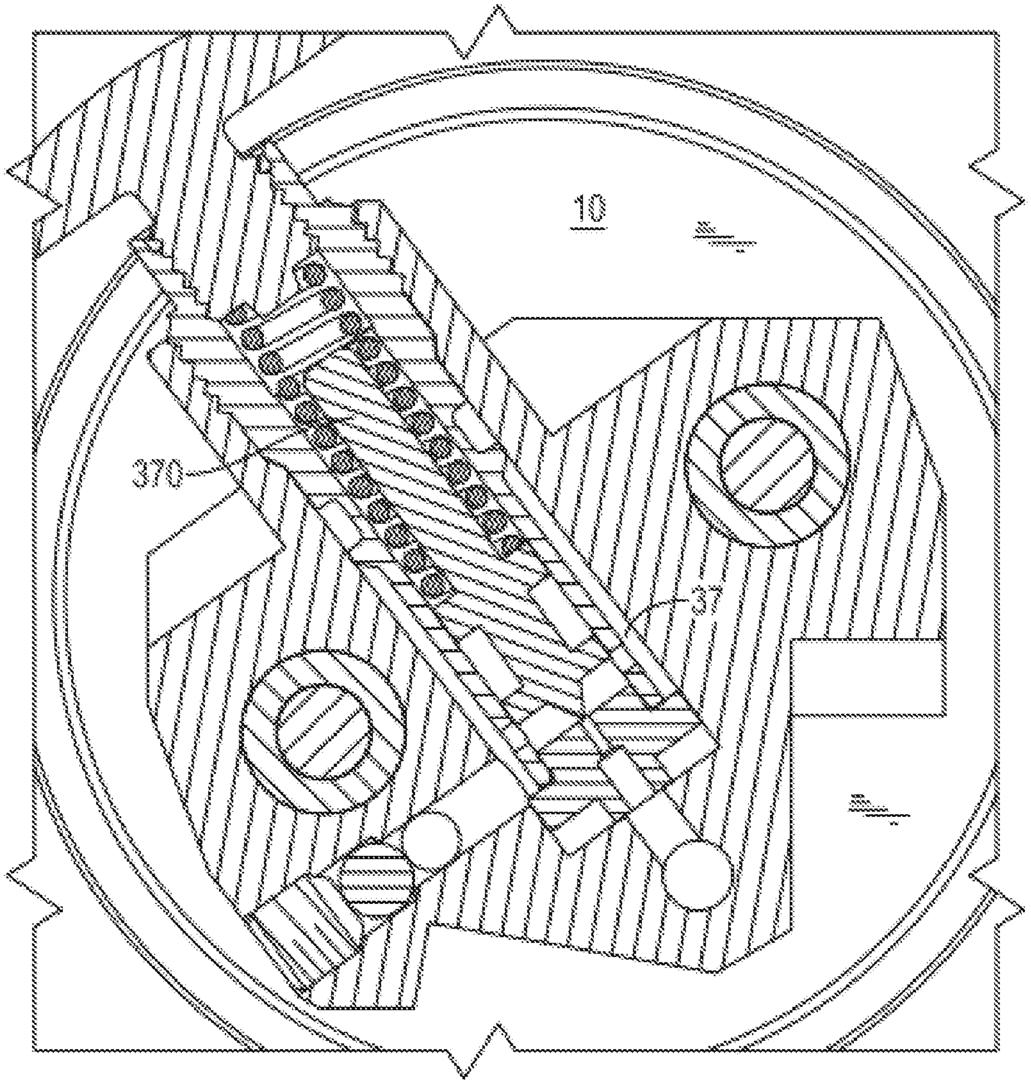
FIG. 9 is a cross-sectional view of the automatic oil return structure taken across line 9-9 in FIG. 16, showing a cross section of a controlling channel.
Figure 10:
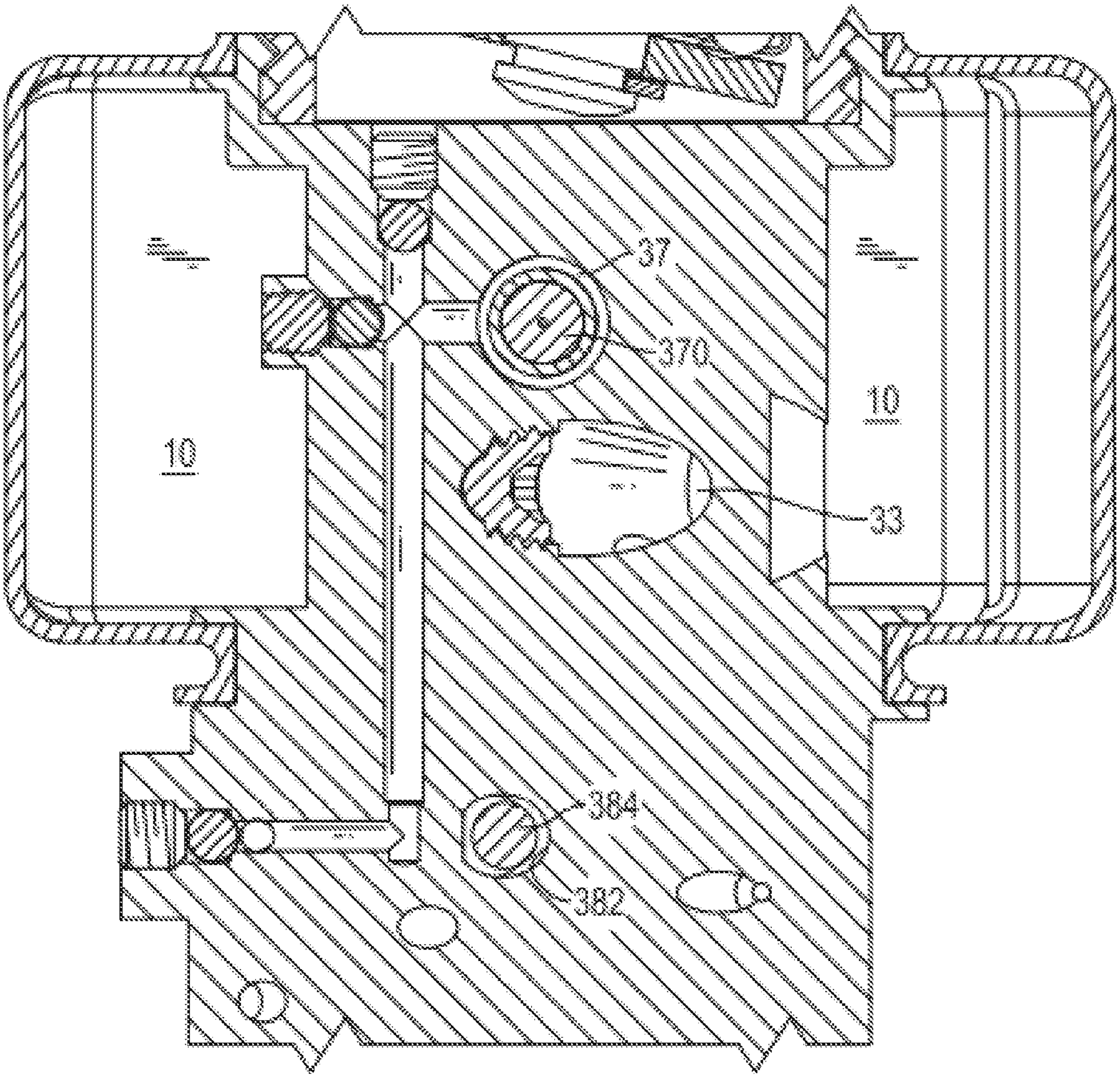
FIG. 10 is a cross-sectional view of the automatic oil return structure taken across line 10-10 in FIG. 15.
Figure 11:
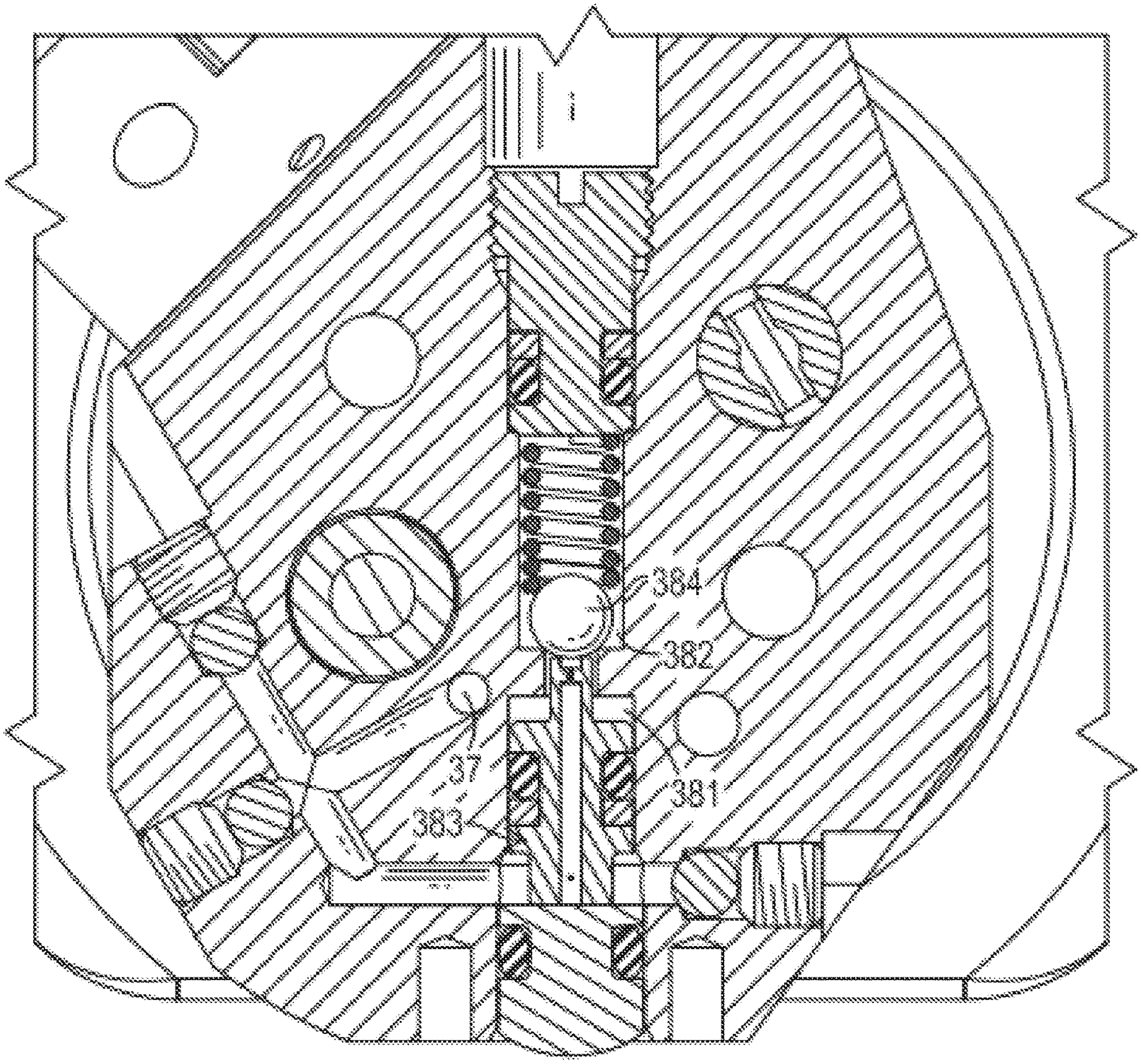
FIG. 11 is a cross-sectional view of the automatic oil return structure taken across line 11-11 in FIG. 16, showing a cross section of an operating channel.
Figure 12:
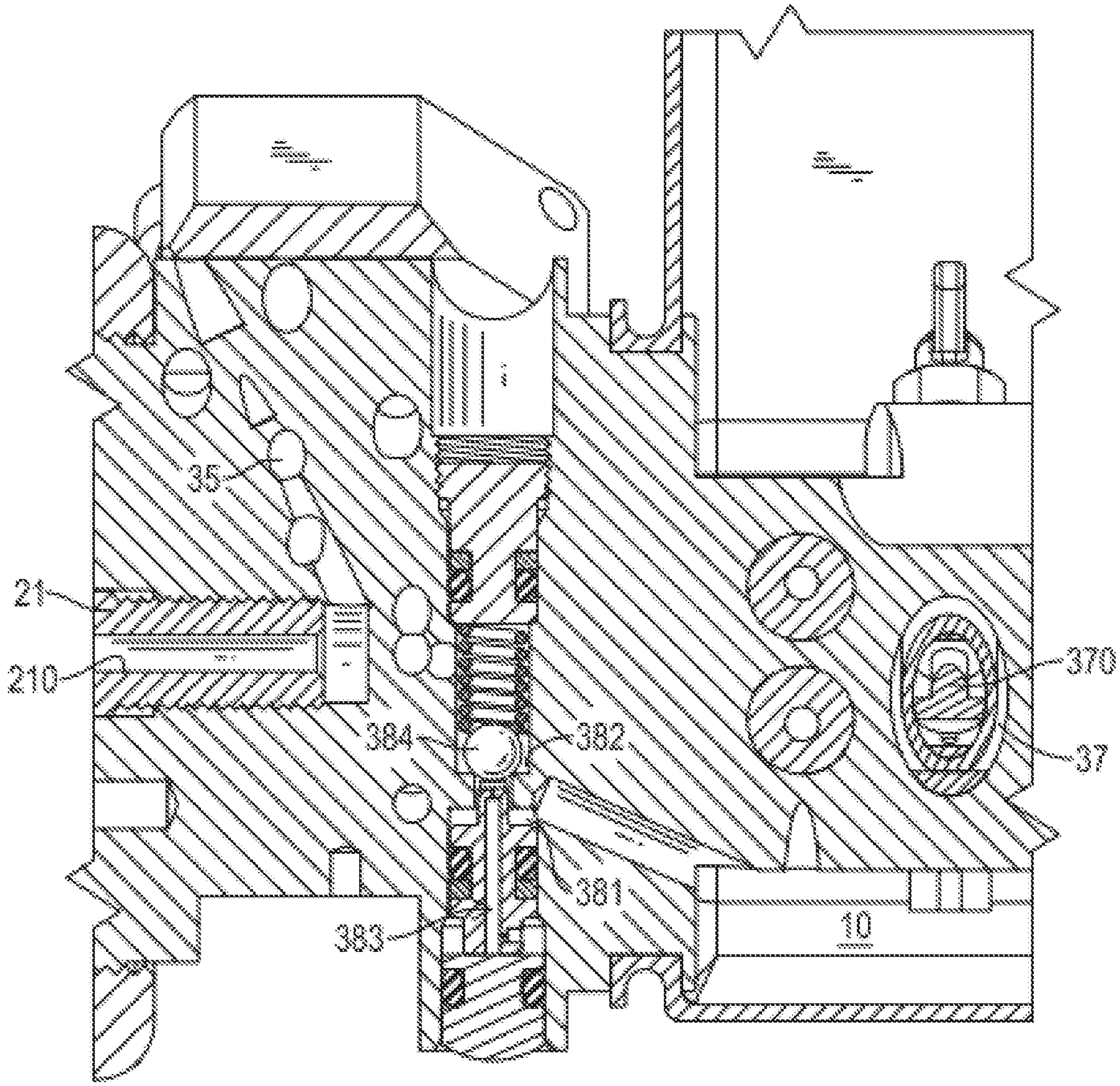
FIG. 12 is a cross-sectional view of the automatic oil return structure taken across line 12-12 in FIG. 17, showing a cross section of an operating channel.
Figure 13:
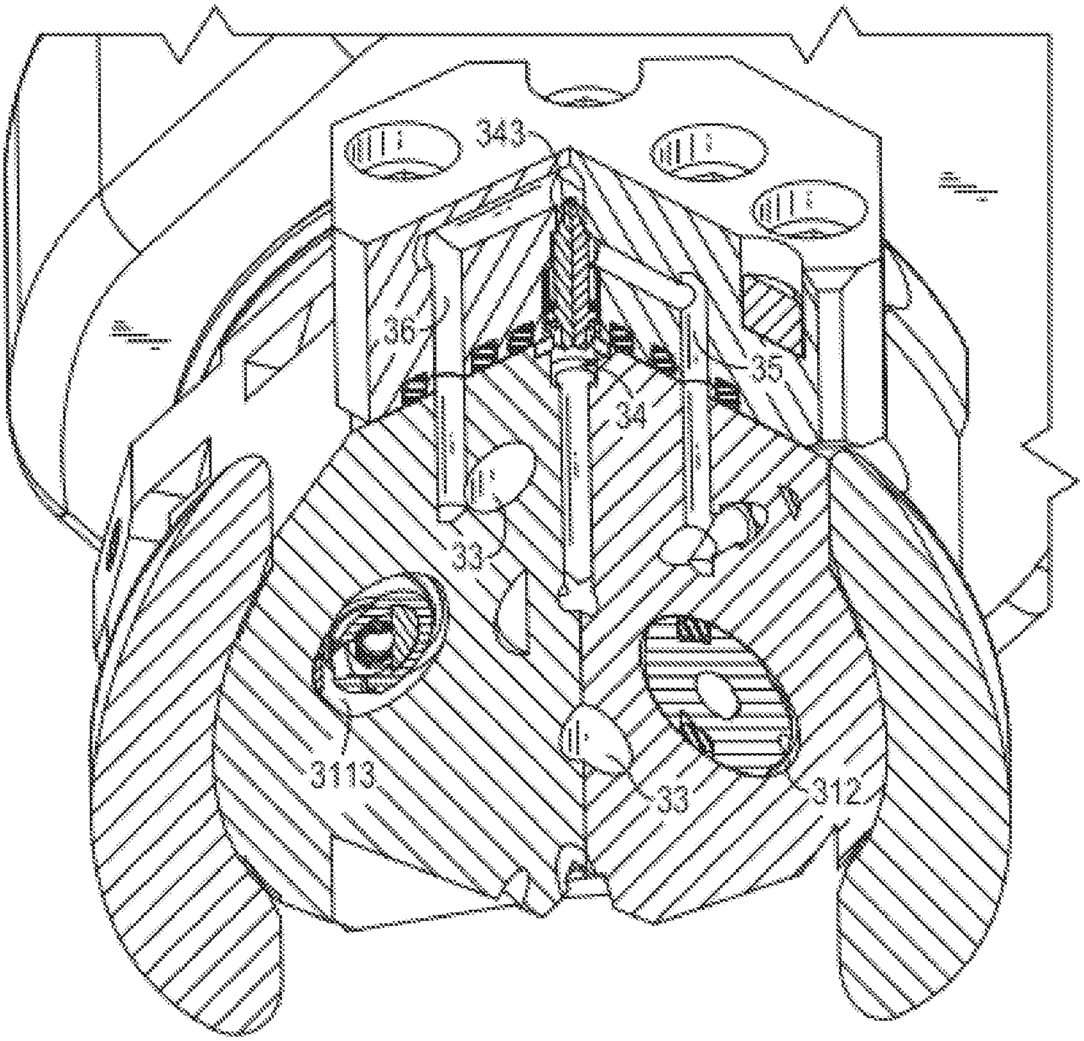
FIG. 13 is a cross-sectional view of the automatic oil return structure taken across line 13-13 in FIG. 18, showing cross sections of a switch channel, a pressurization channel, and an oil returning channel.
Figure 14:
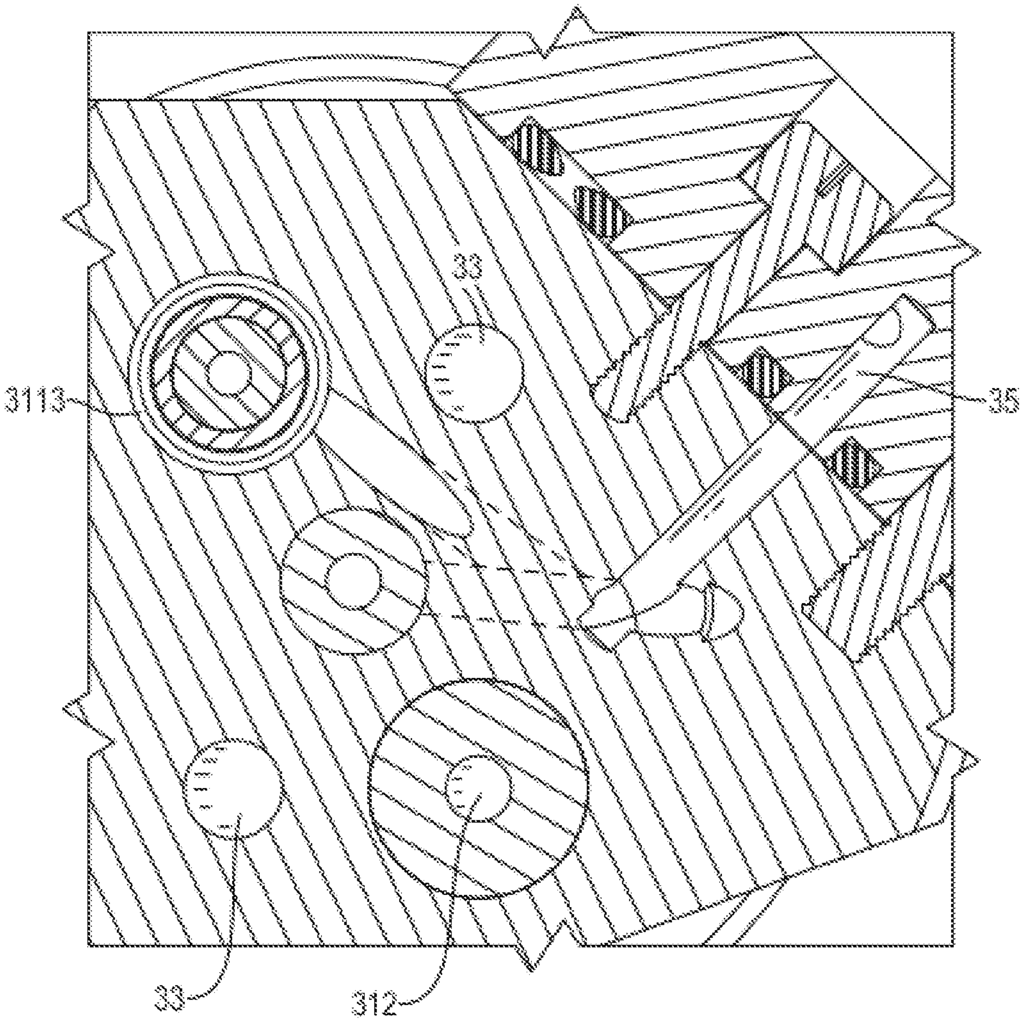
FIG. 14 is a cross-sectional view of the automatic oil return structure taken across line 14-14 in FIG. 17, showing a pressurization channel fluidly communicating with a second main section.
Figure 16:
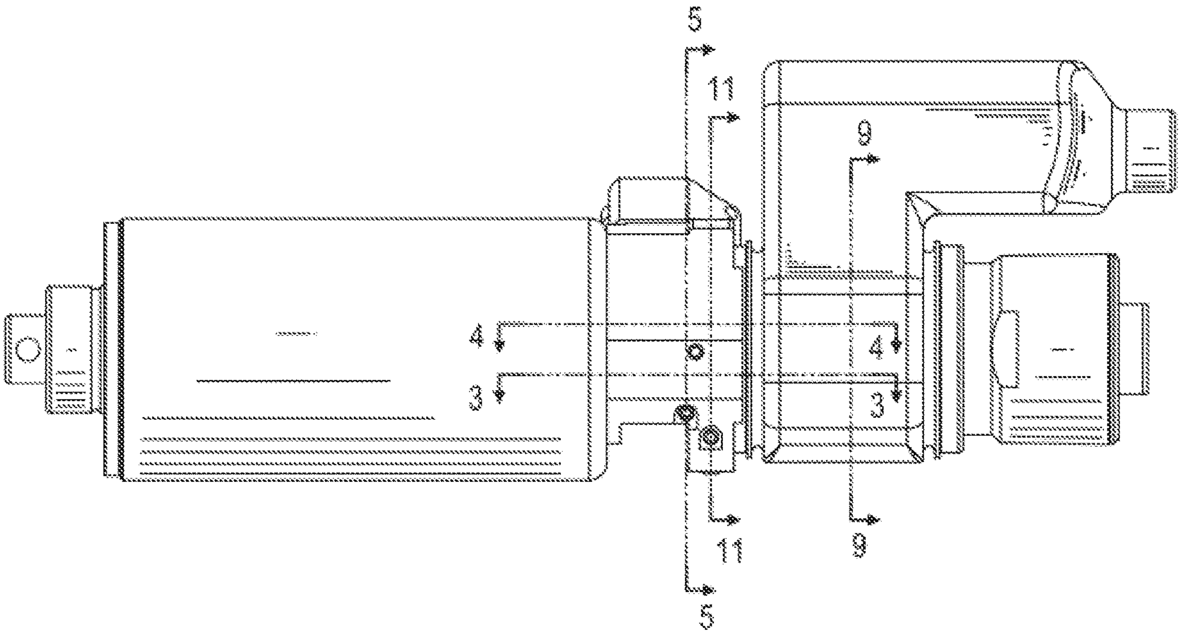
FIG. 16 is a side view of the automatic oil return structure in FIG. 1.
Figure 17:
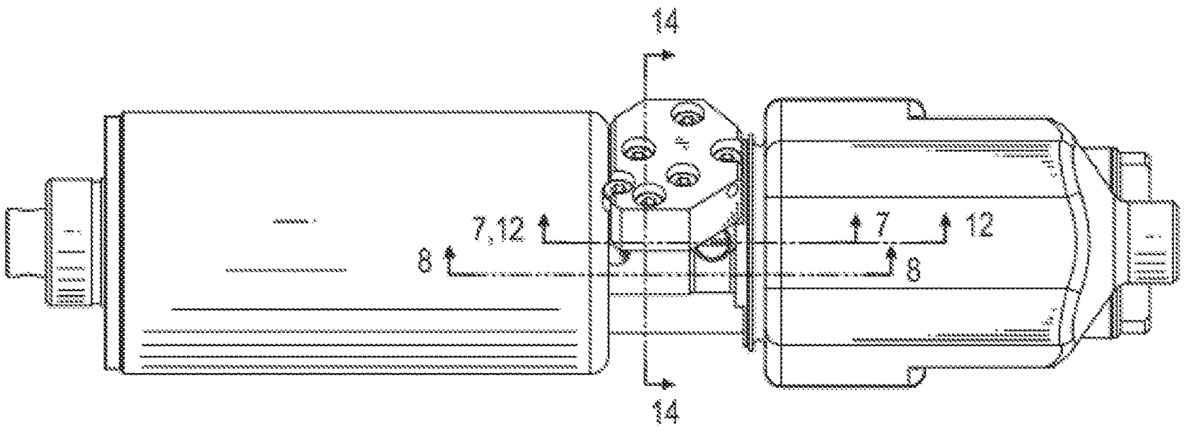
FIG. 17 is a top view of the automatic oil return structure in FIG. 1.
Figure 18:
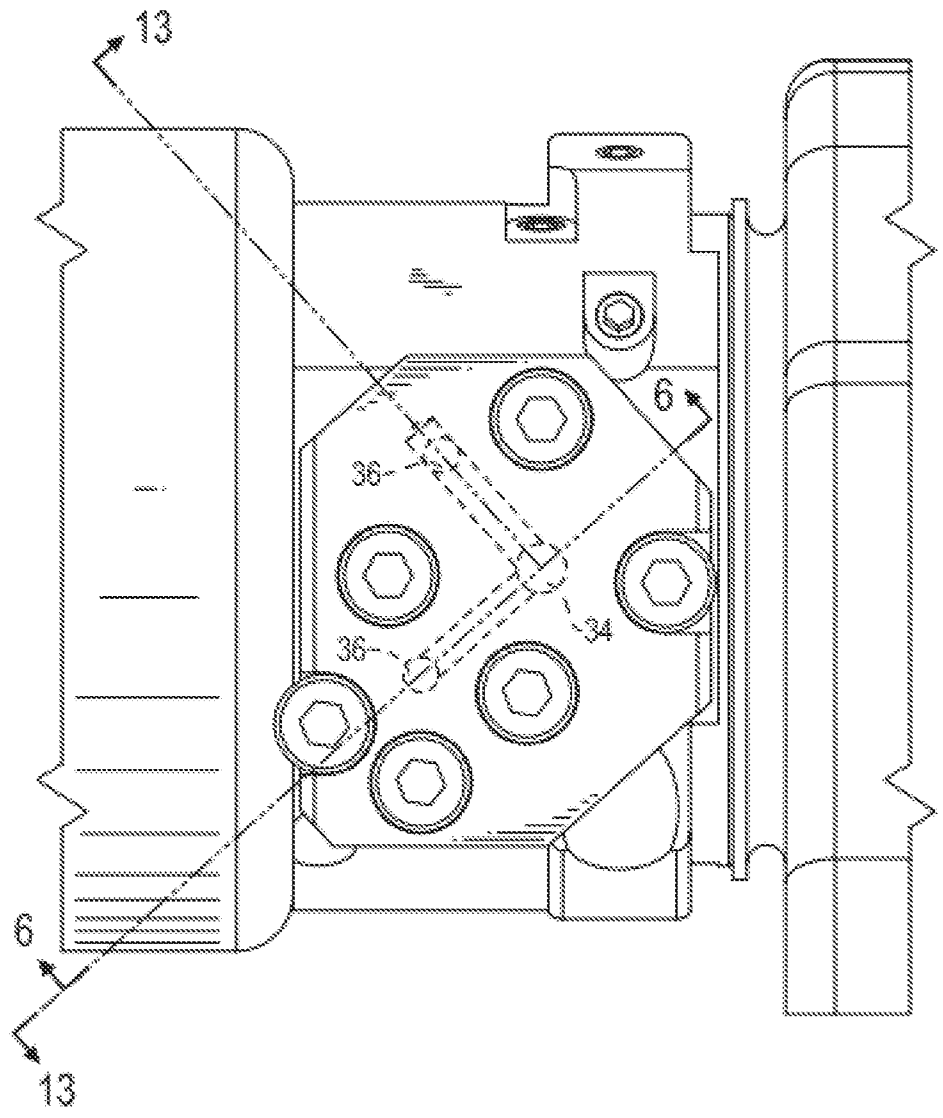
FIG. 18 is a partial enlarged view of the automatic oil return structure in FIG. 1.

With reference to FIGS. 3 to 18, the main body assembly 30 has two primary channels (as shown in FIG. 3, FIG. 4, and FIG. 16), a communicating channel 32 (as shown in FIG. 5 and FIG. 16), two secondary channels 33 (as shown in FIG. 3, FIG. 4, and FIG. 16), a switch channel 34 (as shown in FIG. 13 and FIG. 18), a pressurization channel 35 (as shown in FIG. 13 and FIG. 18), an oil returning channel 36 (as shown in FIG. 13 and FIG. 18), a controlling channel 37 (as shown in FIG. 9 and FIG. 16), and an operating channel 38 (as shown in FIG. 11, FIG. 12, FIG. 16, and FIG. 17).

As shown in FIG. 3, FIG. 4, and FIG. 16, one end of each primary channel fluidly communicates with the oil storage container 10, and another end fluidly communicates with the second oil reservoir 202. Multiple one-way blocking assemblies are mounted at the two ends of the primary channel, thereby the one-way blocking assemblies restrict the hydraulic oil flowing into or out of the primary channel.

To be more precise, the two primary channels may include a first primary channel 311 and a second primary channel 312. In this embodiment, a primary channel blocking unit 3111 is mounted in the first primary channel 311, thereby the first primary channel 311 is divided into a first main section 3112 and a second main section 3113, and the first main section 3112 does not fluidly communicate with the second main section 3113. However, in another embodiment, the first main section 3112 and the second main section 3113 may be two independent channels instead of being formed in the same channel. The first main section 3112 fluidly communicates with the oil storage container 10, and the second main section 3113 fluidly communicates with the inner channel 210 and the second oil reservoir 202. The communicating channel 32 fluidly communicates with the second primary channel 312 and the first main section 3112, and thereby a pressure in the first main section 3112 remains equal to a pressure of the second primary channel 312.

The one-way blocking assembly may have a first one-way blocking assembly 3131, a second one-way blocking assembly 3132, a third one-way blocking assembly 3133, and a fourth one-way blocking assembly 3134. The first one-way blocking assembly 3131 is configured to prevent the hydraulic oil flowing to the oil storage container 10 from the first main section 3112, and the second one-way blocking assembly 3132 is configured to prevent the hydraulic oil flowing to the second oil reservoir 202 from the second main section 3113. The third one-way blocking assembly 3133 is configured to prevent the hydraulic oil flowing to the oil storage container 10 from the second primary channel 312, and the fourth one-way blocking assembly 3134 is configured to prevent the hydraulic oil flowing to the second primary channel 312 from the second oil reservoir 202.

An end of each one of the secondary channels 33 fluidly communicates with the oil storage container 10, and another end of each one of the secondary channels 33 fluidly communicates with the second oil reservoir 202, thereby keeping pressures in the secondary channels 33 equal to the static pressure in the oil storage container 10. A secondary channel one-way blocking assembly 330 is configured to prevent the hydraulic oil from flowing to the secondary channel 33 from the second oil reservoir 202. In another embodiment, the main body assembly 30 may have only one secondary channel 33.

Figure 6:
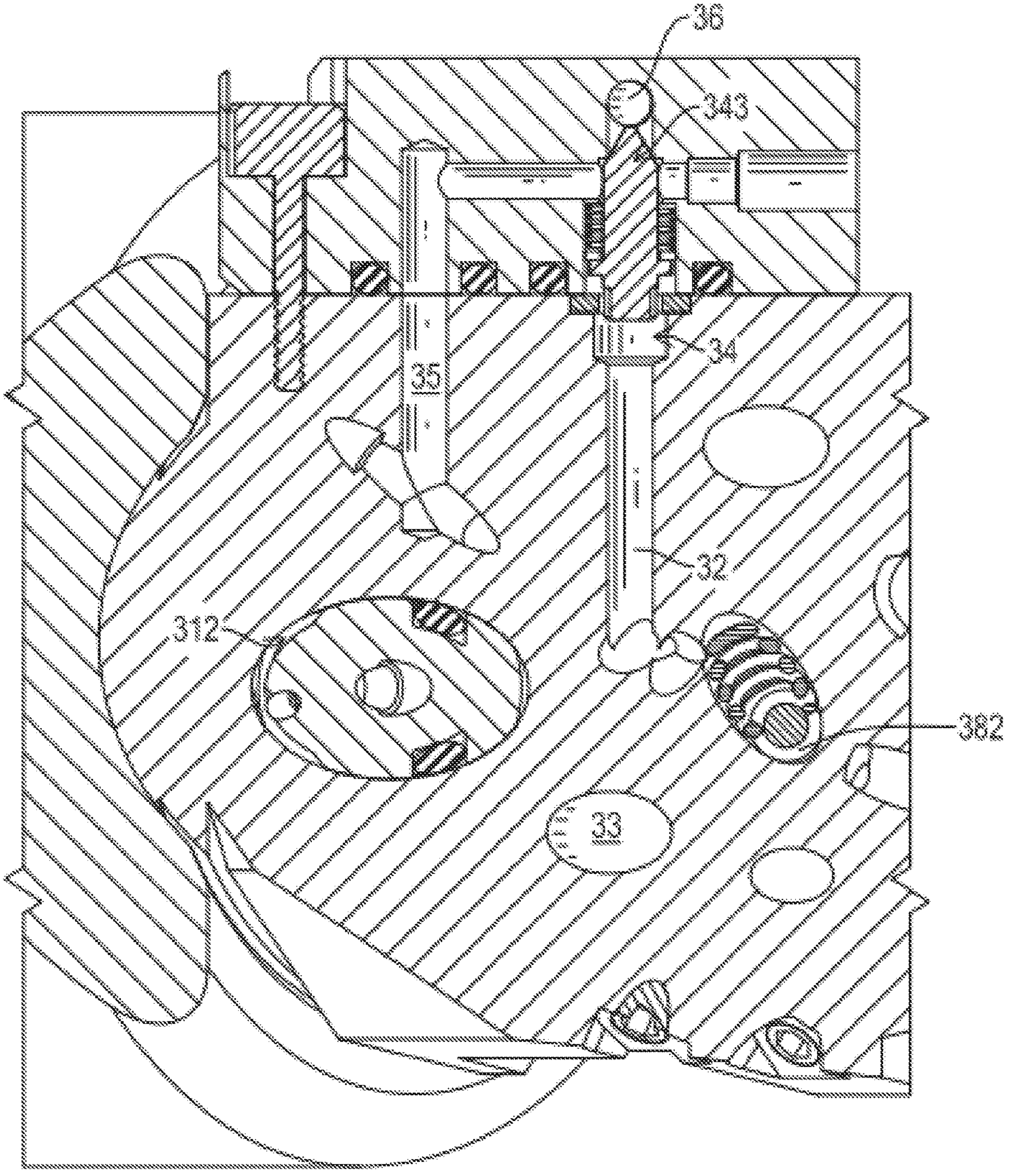
FIG. 6 is a cross-sectional view of the automatic oil return structure taken across line 6-6 in FIG. 18, showing a cross section of a switch channel.

As shown in FIG. 5, FIG. 6, and FIG. 13, the switch channel 34 fluidly communicates with the first main section 3112, the pressurization channel 35, and the oil returning channel 36. In other words, the first main section 3112, the pressurization channel 35, and the oil returning channel 36 fluidly communicate with each other via the switch channel 34. To be more precise, an end of the pressurization channel 35 fluidly communicates with the switch channel 34, and another end fluidly communicates with the inner channel 210. An end of the oil returning channel 36 fluidly communicates with the switch channel 34, and another end fluidly communicates with the oil storage container 10. In this embodiment, the switch channel 34 includes a first switch opening 341 and a second switch opening 342. The first switch opening 341 fluidly communicates with the first main section 3112. The pressurization channel 35 fluidly communicates with a position between the first switch opening 341 and the second switch opening 342 of the switch channel 34. The second switch opening 342 fluidly communicates with the oil returning channel 36.

Figure 6A:
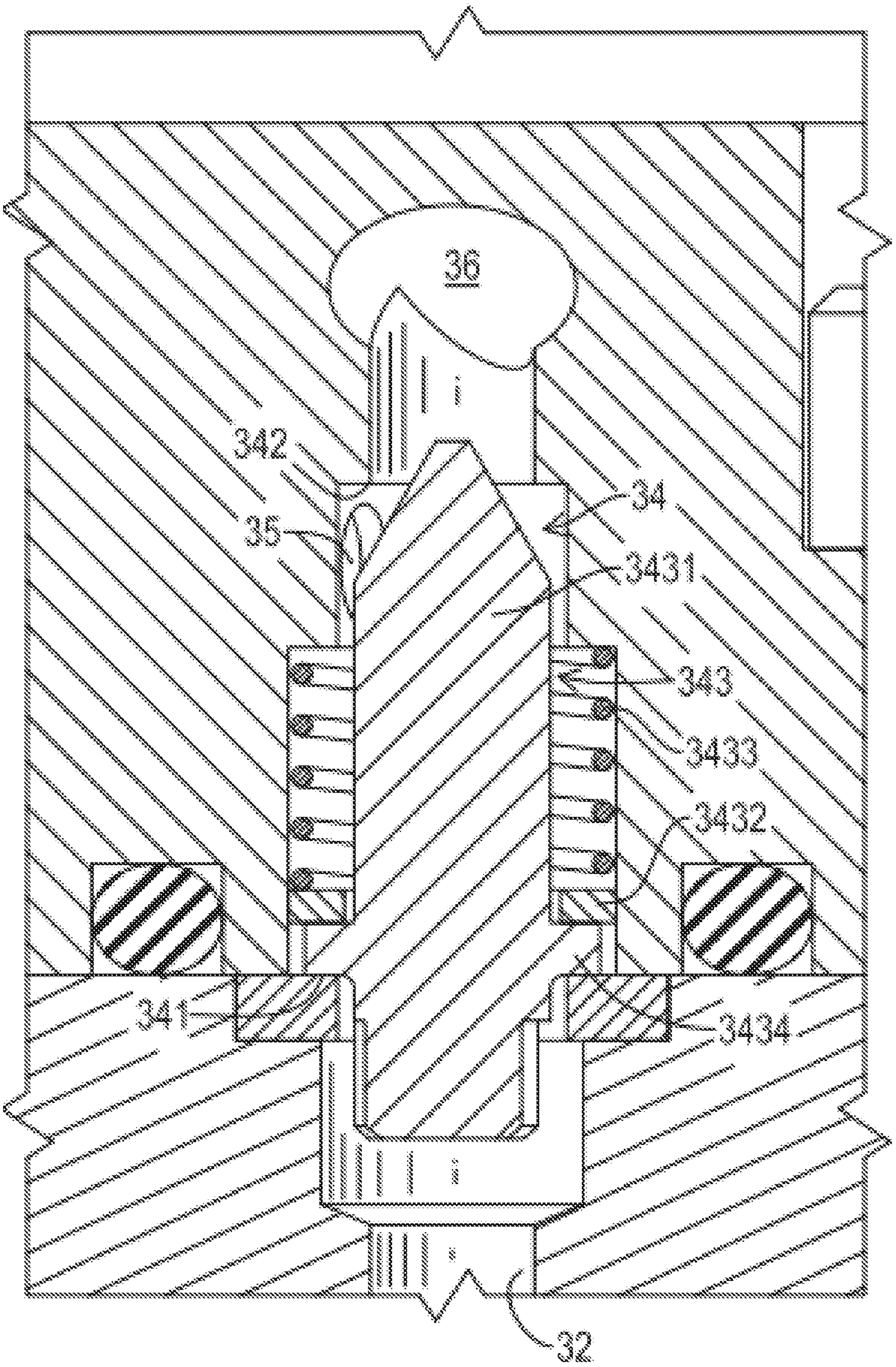
FIG. 6A is a cross-sectional view of the automatic oil return structure in FIG. 1, showing a switch assembly blocking a first switch opening.
Figure 6B:
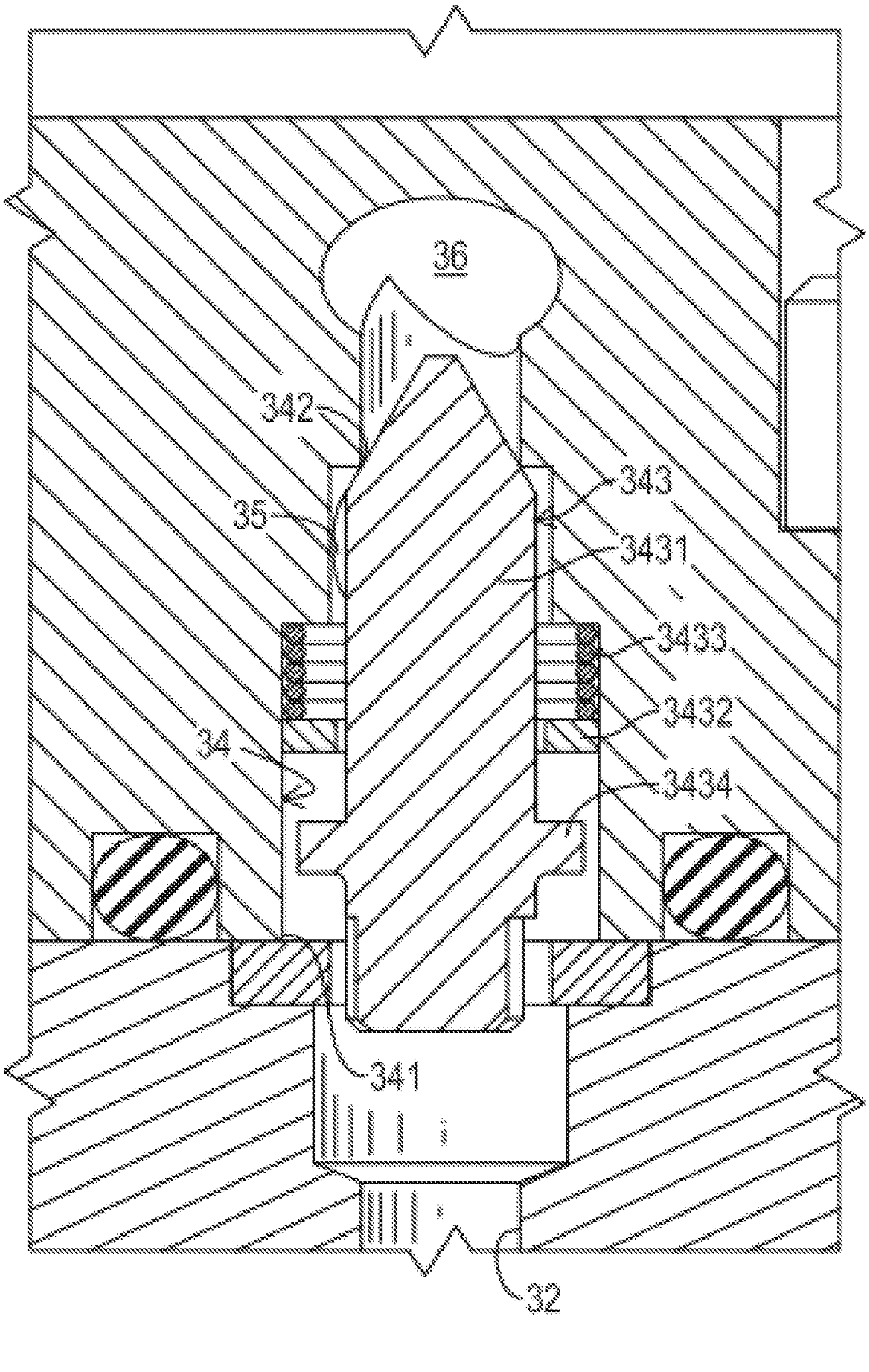
FIG. 6B is a cross-sectional view of the automatic oil return structure in FIG. 1, showing a switch assembly blocking a second switch opening.

With reference to FIG. 6A and FIG. 6B together, a switch assembly 343 is mounted in the switch channel 34 and selectively blocks the switch channel 34, thereby only two among the first main section 3112, the pressurization channel 35, and the oil returning channel 36 are capable of fluidly communicating with each other at the same time.

The switch assembly 343 has a switch plug 3431, a switch gasket 3432, and a switch elastic unit 3433. The switch plug 3431 is movably mounted in the switch channel 34, and selectively moves to block the first switch opening 341 or the second switch opening 342. The switch plug 3431 has an annular protrusion 3434, and a gap is formed between an outer annular surface of the annular protrusion 3434 and an inner annular surface of the switch channel 34.

The switch gasket 3432 is mounted in the switch channel 34, and is movably sleeved on the switch plug 3431. An outer annular surface of the switch gasket 3432 abuts an inner annular surface of the switch channel 34, and a gap is formed between an inner surface of the switch gasket 3432 and the switch plug 3431. An inner diameter of the switch gasket 3432 is shorter than an outer diameter of the annular protrusion 3434, thereby the switch gasket 3432 selectively abuts one side of the annular protrusion 3434, and the switch channel 34 is blocked as long as the switch gasket 3432 is abutting the annular protrusion 3434. The switch elastic unit 3433 abuts the switch gasket 3432, pressing the switch gasket 3432 to be configured to abut the annular protrusion 3434.

As shown in FIG. 9 and FIG. 16, the controlling channel 37 fluidly communicates with the first main section 3112, and a controlling assembly 370 is mounted in the controlling channel 37 and selectively blocks the controlling channel 37.

As shown in FIG. 7, FIG. 11 FIG. 12, FIG. 16, and FIG. 17, the operating channel 38 has a first operating section 381 and a second operating section 382. An end of the first operating section 381 fluidly communicates with the controlling channel 37, and another end of the first operating section 381 fluidly communicates with the oil storage container 10 and the second operating section 382. A first operating plug 383 is movably mounted in the first operating section 381, and the position where the controlling channel 37 fluidly communicates with the first operating section 381 and the position where the first operating section 381 fluidly communicates with the oil storage container 10 are located at two sides of the first operating plug 383 respectively. A second operating plug 384 is mounted in the operating channel 38 and selectively isolates the first operating section 381 from the second operating section 382.

Figure 7:
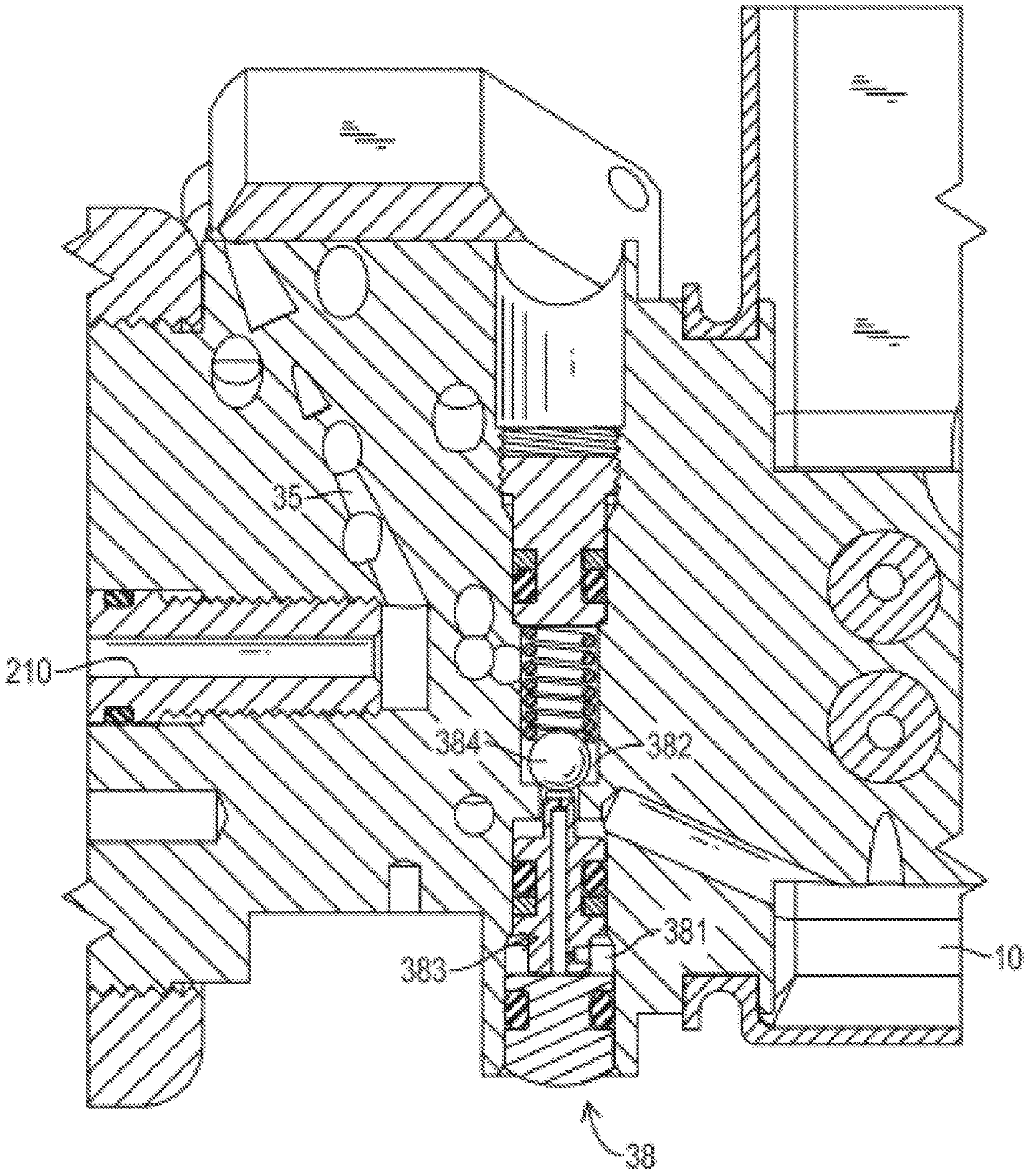
FIG. 7 is a cross-sectional view of the automatic oil return structure taken across line 7-7 in FIG. 17, showing a cross section of an operating channel.
Figure 7A:
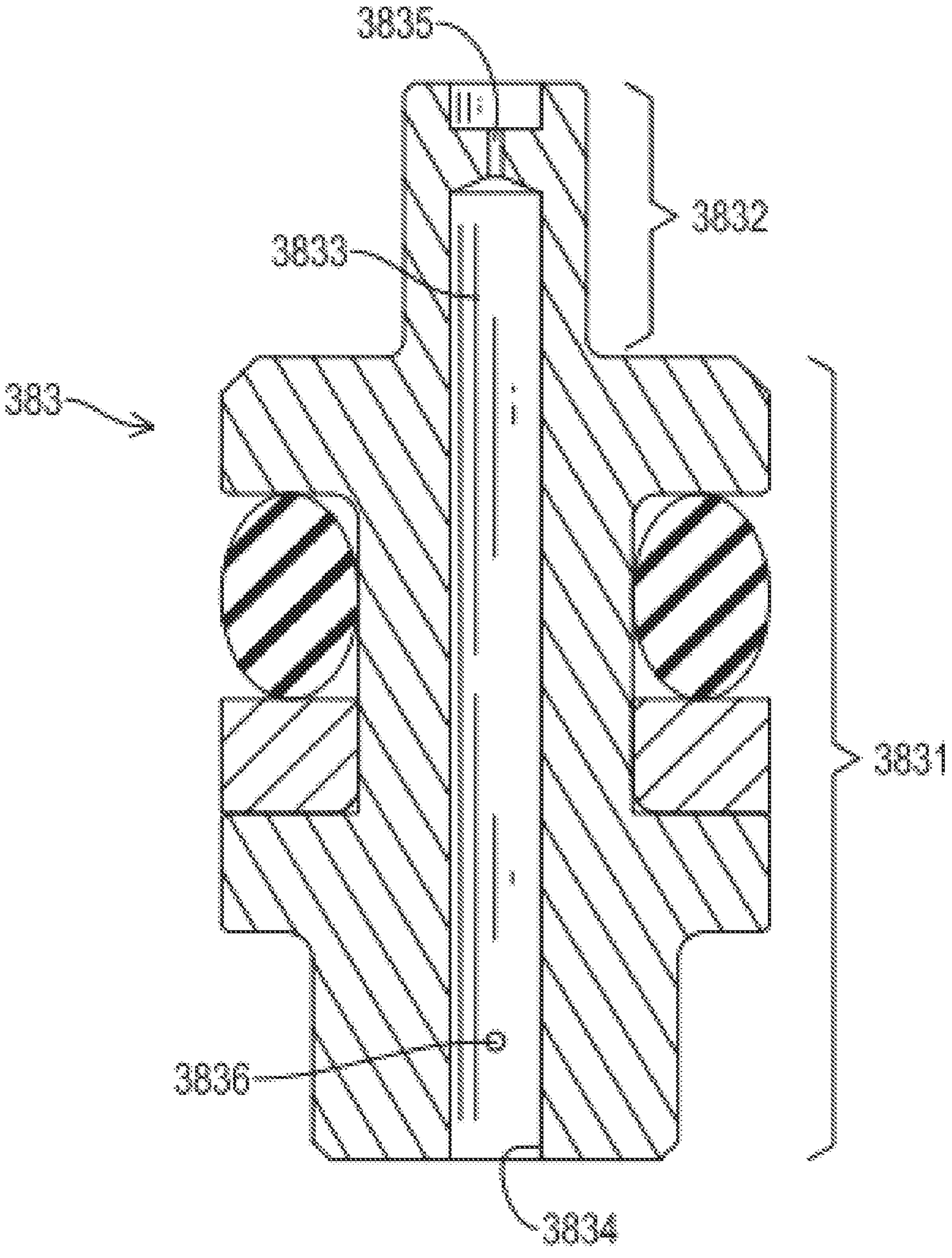
FIG. 7A is a cross-sectional view of a first operating plug of the automatic oil return structure in FIG. 1.
Figure 8:
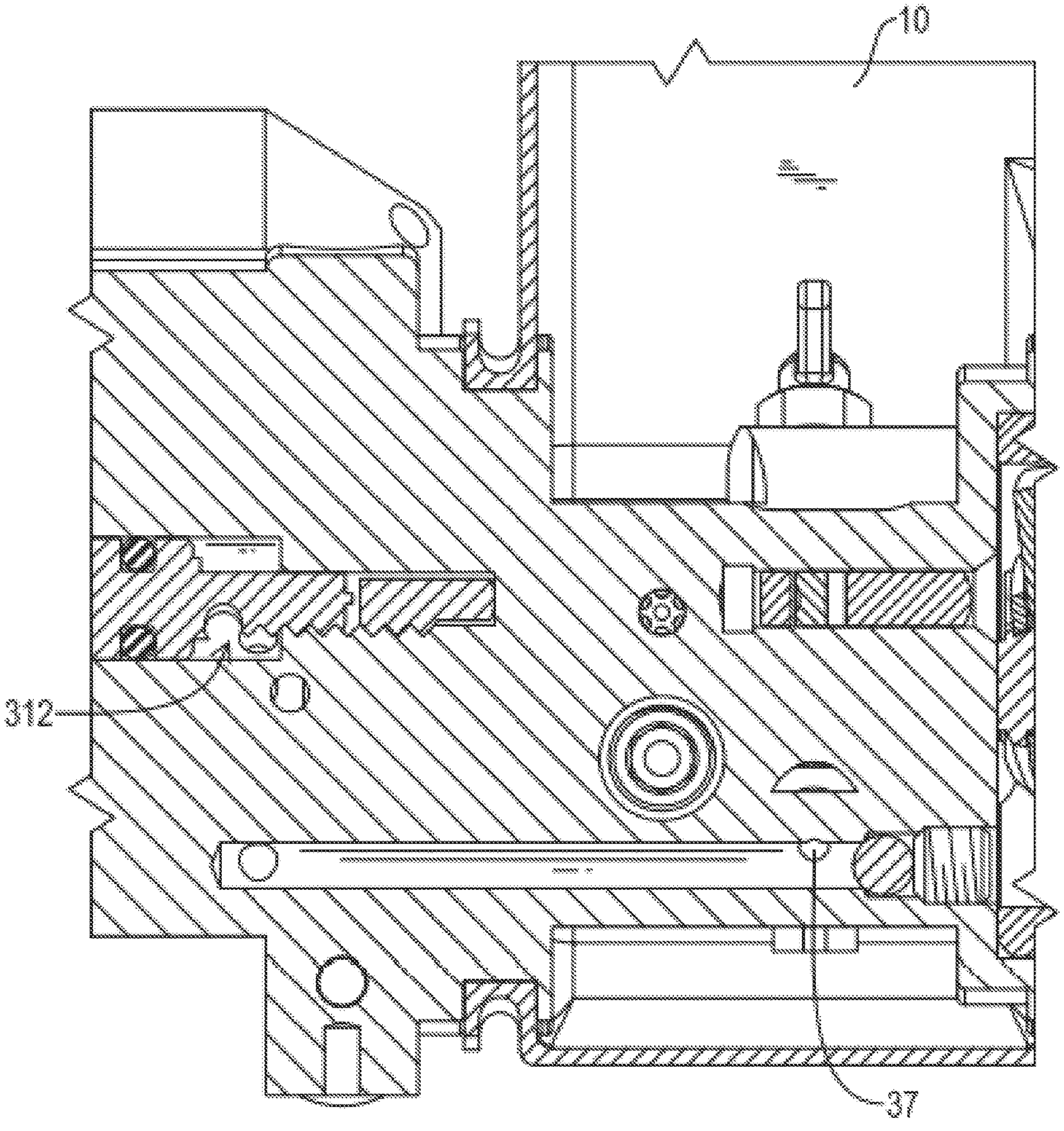
FIG. 8 is a cross-sectional view of the automatic oil return structure taken across line 8-8 in FIG. 17.

Next please refer to FIG. 7A together. In this embodiment, the first operating plug 383 has a first section 3831 and a second section 3832 which fluidly communicate with each other. An outer annular surface of the first section 3831 seals and abuts an inner annular surface of the first operating section 381, therefore, the first operating section is separated into two parts. The second section 3832 is capable of going through a position where the first operating section 381 connects to the second operating section 382, and thereby the second section 3832 is capable of moving into the second operating section 382. A gap is formed between an outer annular surface of the second section 3832 and an inner wall surface of the position where the first operating section 381 connects to the second operating section 382.

The first operating plug 383 has an inner flow channel 3833, a first opening 3834, and a second opening 3835. The inner flow channel 3833 is formed through the first section 3831 and the second section 3832 of the first operating plug 383, and the first opening 3834 and the second opening 3835, which are respectively at two opposite ends of the inner flow channel 3833, connect the inner flow channel 3833 to the exterior. The outer annular surface of the first section 3831 is disposed between the first opening 3834 and the second opening 3835. To be more precise, the first opening 3834 may be formed at the first section 3831 and fluidly communicates with the inner flow channel 3833, the first operating section 381, and the controlling channel 37. The second opening 3835 may be formed at the first operating plug 383 and fluidly communicates with the inner flow channel 3833, the first operating section 381 or the second operating section 382, and the oil storage container 10. To be more precise, the second opening 3835 may be formed on an end surface of the second section 3832, and the end surface of the second section 3832 is adjacent to the second operating plug 384. The second opening 3835 enters the second operating section 382 with the second section 3832 of the first operating plug 383 entering the second operating section 382. In this embodiment, a cross-sectional area of the second opening 3835 is much smaller than a cross-sectional area of the inner flow channel 3833.

Besides, the first operating plug 383 may have a third opening 3836 formed at the first section 3831 of the first operating plug 383, and thereby the third opening 3836 is located in the first operating section 381, and thus fluidly communicates with the inner flow channel 3833 and the first operating section 381. In this embodiment, the third opening 3836 is formed on a lateral surface of the first operating plug 383. A cross-sectional area of the third opening 3836 is much smaller than the cross-sectional area of the inner flow channel 3833.

However, in another embodiment, the first operating plug 383 may be solid, and therefore, the first operating plug 383 may not have the inner flow channel 3833, the first opening 3834, the second opening 3835, and the third opening 3836.

Via the structures aforementioned, the pressure of the first main section 3112 is lower than a starting pressure before the oil returning structure starts. Meanwhile, as shown in FIG. 6A, the switch plug 3431 blocks the first switch opening 341 via the abutting of the switch elastic unit 3433, and the switch gasket 3432 abuts the annular protrusion 3434. Besides, the controlling assembly 370 blocks the controlling channel 37, and the second operating plug 384 isolates the first operating section 381 from the second operating section 382.

When a piston pump with the automatic oil return structure in this disclosure is actuated, the driving assembly 40 drives the hydraulic oil to enter the first main section 3112 from the oil storage container 10 via the first one-way blocking assembly 3131, and drives the hydraulic oil to enter the second primary channel 312 via the third one-way blocking assembly 3133. The first one-way blocking assembly 3131 and the third one-way blocking assembly 3133 are capable of preventing the hydraulic oil flowing back, therefore, the pressure of the first main section 3112 and the pressure of the second primary channel 312 are higher than the pressure of the oil storage container 10.

When the pressure of the first main section 3112 rises and gets higher than the starting pressure, the pressure of the first main section 3112 pushes the switch assembly 343 and drives the switch assembly 343 to move to isolate the switch channel 34 from the oil returning channel 36, and the switch channel 34 keeps fluidly communicating with the first main section 3112 and the pressurization channel 35.

To be more precise, when the pressure of the first main section 3112 is higher than the starting pressure, the pressure of the first main section 3112 would drive the switch plug 3431 to move to open the first switch opening 341, and thereby the first main section 3112 keeps fluidly communicating with the pressurization channel 35. Meanwhile, the switch plug 3431 also blocks the second switch opening 342, and thus isolates the switch channel 34 from the oil returning channel 36. Next, as shown in FIG. 6B, the pressure of the first main section 3112 separates the switch gasket 3432 and the annular protrusion 3434 and open the switch channel 34, thereby the first main section 3112 fluidly communicates with the pressurization channel 35, and thereby the hydraulic oil is capable of flowing from the first switch opening 341 to the pressurization channel 35 via the gap between the switch gasket 3432 and the annular protrusion 3434. Therefore, the hydraulic oil flows sequentially via the first main section 3112, the switch channel 34, the pressurization channel 35, and the inner channel 210, and then flows into the first oil reservoir 201.

The first oil reservoir 201 is expanded along with the driving assembly 40 keeping pumping the hydraulic oil into the first oil reservoir 201, and then the displacement unit 22 moves. The volume of the second oil reservoir 202 is expanded along with moving of the displacement unit 22, and thus the pressure of the second oil reservoir 202 would be lower than the static pressure, thereby the hydraulic oil in the oil storage container 10 is capable of passing through the secondary channel one-way blocking assembly 330, and then the hydraulic oil flows through the secondary channel 33 and is sucked into the second oil reservoir 202. In this case, all of the hydraulic oil pumped by the driving assembly 40 enters the first oil reservoir 201, and thus the displacement unit 22 moves faster.

As long as the pressure of the first main section 3112 gets higher than a pressurizing pressure, the hydraulic oil is capable of pushing the fourth one-way blocking assembly 3134 and then flows into the second oil reservoir 202 from the second primary channel 312. In this case, the hydraulic oil pumped by the driving assembly 40 enters the first oil reservoir 201 as well as the second oil reservoir 202, and thus the displacement unit 22 moves slower, but the user can control the position of the displacement unit 22 more precisely.

As the driving assembly 40 does not pumps the hydraulic oil into the first main section 3112 and the second primary channel 312 steadily and constantly, the pressures of the first main section 3112 and the second primary channel 312 would have periodic fluctuation. Under the periodic fluctuation of pressure, along with the pressure of the first main section 3112 rising and getting higher than a maximum pressure at a certain moment, the pressure of the first main section 3112 pushes the controlling assembly 370 and makes the first main section 3112 fluidly communicate with the first operating section 381. Then the pressure of the first main section 3112 would slightly lower down under the periodic fluctuation of pressure. Since the first main section 3112 keeps fluidly communicating with the second operating section 382, the pressure of the first main section 3112 is equal to that of the second operating section 382. In other words, as long as the controlling assembly 370 is pushed away, the pressure of the first operating section 381 is higher than the pressure of the second operating section 382 and the first main section 3112, and thus the first operating plug 383 is capable of moving to push the second operating plug 384, thereby the second operating section 382 fluidly communicates with the first operating section 381 and the oil storage container 10. When the second operating section 382 fluidly communicates with the oil storage container 10, the first main section 3112 would lower down to the static pressure.

As long as the pressure of the first main section 3112 lowers down to the static pressure, the switch plug 3431 of the switch assembly 343 is pushed back to a starting position by the switch clastic unit 3433, i.e., the switch plug 3431 is pushed back to block the first switch opening 341 and open the second switch opening 342. Therefore, the switch assembly 343 isolates the switch channel 34 from the first main section 3112, and the switch channel 34 keeps fluidly communicating with the pressurization channel 35 and the oil returning channel 36. Thereafter, the displacement unit 22 moves toward the starting position via the returning elastic unit 24 and compresses the first oil reservoir 201 and the second oil reservoir 202 to return oil. Meanwhile, the hydraulic oil flows to the oil storage container 10 from the first oil reservoir 201 via the inner channel 210, the pressurization channel 35, and the oil returning channel 36; the hydraulic oil in the second oil reservoir 202 also pushes the second one-way blocking assembly 3132 to flow into the second main section 3113, and then flows to the oil storage container 10 via the pressurization channel 35 and the oil returning channel 36.

Besides, the user is able to conduct the oil returning to release pressure before achieving the maximum pressure. To be more precise, the user can press a pressure relief button that coordinates with the first operating plug 383, making the first operating plug 383 move to push the second operating plug 384, thereby the second operating section 382 fluidly communicates with the first operating section 381 and oil storage container 10, and makes the pressure of the first main section 3112 lower down to the static pressure.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An automatic oil return structure comprising:

an oil storage container containing hydraulic oil inside, the hydraulic oil in the oil storage container keeping at a static pressure;

a piston assembly disposed spaced apart from the oil storage container, the piston assembly having:

an inner tube having an inner channel;

a displacement unit sleeved on the inner tube, and the displacement unit sealed on an outer wall surface of the inner tube;

a first oil reservoir formed within the displacement unit and fluidly communicating with the inner channel;

an outer tube sleeved on the displacement unit; the displacement unit sealed on an inner wall surface of the outer tube, and the displacement unit being capable of moving with respect to the inner tube and the outer tube; and a second oil reservoir formed among the outer tube, the inner tube, and the displacement unit;

a main body assembly disposed between the oil storage container and the piston assembly, and comprising:

a first main section fluidly communicating with the oil storage container;

a second main section fluidly communicating with the first oil reservoir and the second oil reservoir;

a first one-way blocking assembly being capable of preventing the hydraulic oil from flowing from the first main section to the oil storage container;

a second one-way blocking assembly being capable of preventing the hydraulic oil from flowing from the second main section to the second oil reservoir;

a switch channel fluidly communicating with the first main section;

a switch assembly mounted in the switch channel and selectively blocking the switch channel;

a pressurization channel with an end fluidly communicating with the switch channel and another end fluidly communicating with the first oil reservoir;

an oil returning channel with an end fluidly communicating with the switch channel and another end fluidly communicating with the oil storage container;

a controlling channel fluidly communicating with the first main section;

a controlling assembly mounted in the controlling channel and selectively blocking the controlling channel;

an operating channel having a first operating section and a second operating section, an end of the first operating section fluidly communicating with the controlling channel, and another end of the first operating section fluidly communicating with the oil storage container and the second operating section;

a first operating plug movably mounted in the first operating section of the operating channel, positions where the controlling channel fluidly communicates with the first operating section and where the oil storage container fluidly communicates with the first operating section disposed at two respective sides of the first operating plug;

a second operating plug mounted in the operating channel and selectively isolating the first operating section from the second operating section;

wherein, when a pressure of the first main section is higher than a starting pressure, the pressure of the first main section drives the switch assembly to move and isolate the switch channel from the oil returning channel, and the switch channel keeps fluidly communicating with the first main section and the pressurization channel, and thus the hydraulic oil flows into the first oil reservoir via the inner channel; the starting pressure is higher than the static pressure;

when the pressure of the first main section achieves a maximum pressure, the pressure of the first main section pushes the controlling assembly, and thus the first main section fluidly communicates with the first operating section; the pressure of the first main section also drives the first operating plug to push the second operating plug to move, and thus the second operating section fluidly communicates with the first operating section and the oil storage container; when the second operating section fluidly communicates with the oil storage container, the pressure of the first main section lowers down to the static pressure; the maximum pressure is higher than the starting pressure;

when the pressure of the first main section lowers down to the static pressure, the switch assembly moves and isolates the switch channel from the first main section, and the switch channel keeps fluidly communicating with the pressurization channel and the oil returning channel, and then the hydraulic oil passes by the inner channel, the pressurization channel, and the oil returning channel from the first oil reservoir to the oil storage container; the hydraulic oil in the second oil reservoir pushes the second one-way blocking assembly and enters the second main section, and the hydraulic oil flows toward the oil storage container via the pressurization channel and the oil returning channel.

2. The automatic oil return structure as claimed in claim 1, wherein, the main body assembly comprises a first primary channel and a primary channel blocking unit, and the primary channel blocking unit is mounted in the first primary channel, and thus the first primary channel isolates the first main section from the second main section.

3. The automatic oil return structure claimed as claim 1, wherein, the main body assembly comprises:

a primary channel with an end fluidly communicating with the oil storage container, and another end fluidly communicating with the second oil reservoir;

a third one-way blocking assembly capable of preventing the hydraulic oil from flowing from the primary channel to the oil storage container; and a fourth one-way blocking assembly capable of preventing the hydraulic oil from flowing from the second oil reservoir to the primary channel.

4. The automatic oil return structure as claimed in claim 3, wherein, the main body assembly comprises a communicating channel fluidly communicating with the primary channel and the first main section;

when the pressure of the first main section is higher than a pressurizing pressure, the hydraulic oil flows into the second oil reservoir from the primary channel; the maximum pressure is higher than the pressurizing pressure, and the pressurizing pressure is higher than the starting pressure.

5. The automatic oil return structure as claimed in claim 4, wherein, the main body assembly comprises:

a secondary channel with an end fluidly communicating with the oil storage container, and another end fluidly communicating with the second oil reservoir; and a secondary channel one-way blocking assembly capable of preventing the hydraulic oil from flowing from the second oil reservoir to the secondary channel.

6. The automatic oil return structure as claimed in claim 5, wherein, the first operating plug comprises:

an inner flow channel formed in the first operating plug;

a first opening fluidly communicating with the inner flow channel and the controlling channel;

a second opening formed on an end surface of the first operating plug, and the end surface adjacent to the second operating plug; the first opening fluidly communicating with the inner flow channel and the oil storage container; and an outer annular surface abutting and sealing an inner surface of the first operating section; the outer annular surface disposed between the first opening and the second opening.

7. The automatic oil return structure as claimed in claim 6, wherein:

two ends of the switch channel are a first switch opening and a second switch opening; the first switch opening fluidly communicates with the first main section; a position where the switch channel fluidly communicates with the pressurization channel is located between the first switch opening and the second switch opening; the second switch opening fluidly communicates with the oil returning channel;

the switch assembly comprises:

a switch plug movably mounted in the switch channel, and selectively blocking the first switch opening or the second switch opening; the switch plug having:

an annular protrusion disposed in the switch channel, and a gap formed between an outer annular surface of the annular protrusion and an inner annular surface of the switch channel;

a switch gasket mounted in the switch channel and movably sleeved on the switch plug, and an outer annular surface of the switch gasket abutting the inner annular surface of the switch channel, a gap formed between an inner annular surface of the switch gasket and the switch plug; an inner diameter of the switch gasket being smaller than an outer diameter of the annular protrusion, thereby the switch gasket selectively abutting the annular protrusion, and the first switch opening blocked as long as the switch gasket keeps abutting the annular protrusion; and a switch elastic unit abutting the switch gasket, pressing the switch gasket such that the switch gasket is configured to abut the annular protrusion;

when the pressure of the first main section is lower than the starting pressure, the switch plug blocks the first switch opening, and the switch gasket abuts the annular protrusion;

when the pressure of the first main section is higher than the starting pressure, the pressure of the first main section drives the switch plug to move to open the first switch opening and block the second switch opening, thereby the switch channel is isolated from the oil returning channel; then the pressure of the first main section separates the switch gasket and the annular protrusion and open the first switch opening, thereby the first main section fluidly communicates with the pressurization channel;

when the pressure of the first main section lowers down to the static pressure, the switch plug moves to block the first switch opening of the switch channel, and opens the second switch opening, thereby the pressurization channel fluidly communicates with the oil returning channel.

8. The automatic oil return structure as claimed in claim 1, wherein, the main body assembly comprises:

a secondary channel with an end fluidly communicating with the oil storage container, and another end fluidly communicating with the second oil reservoir; and a secondary channel one-way blocking assembly capable of preventing the hydraulic oil from flowing from the second oil reservoir to the secondary channel.

9. The automatic oil return structure as claimed in claim 1, wherein, the first operating plug comprises:

an inner flow channel formed in the first operating plug;

a first opening fluidly communicating with the inner flow channel and the controlling channel;

a second opening formed on an end surface of the first operating plug, and the end surface adjacent to the second operating plug; the first opening fluidly communicating with the inner flow channel and the oil storage container; and an outer annular surface abutting and sealing an inner surface of the first operating section; the outer annular surface disposed between the first opening and the second opening.

10. The automatic oil return structure as claimed in claim 1, wherein:

two ends of the switch channel are a first switch opening and a second switch opening; the first switch opening fluidly communicates with the first main section; a position where the switch channel fluidly communicates with the pressurization channel is located between the first switch opening and the second switch opening; the second switch opening fluidly communicates with the oil returning channel;

the switch assembly comprises:

a switch plug movably mounted in the switch channel, and selectively blocking the first switch opening or the second switch opening; the switch plug having:

an annular protrusion disposed in the switch channel, and a gap formed between an outer annular surface of the annular protrusion and an inner annular surface of the switch channel;

a switch gasket mounted in the switch channel and movably sleeved on the switch plug, and an outer annular surface of the switch gasket abutting the inner annular surface of the switch channel, a gap formed between an inner annular surface of the switch gasket and the switch plug; an inner diameter of the switch gasket being smaller than an outer diameter of the annular protrusion, thereby the switch gasket selectively abutting the annular protrusion, and the first switch opening blocked as long as the switch gasket keeps abutting the annular protrusion; and a switch elastic unit abutting the switch gasket, pressing the switch gasket such that the switch gasket is configured to abut the annular protrusion;

when the pressure of the first main section is lower than the starting pressure, the switch plug blocks the first switch opening, and the switch gasket abuts the annular protrusion;

when the pressure of the first main section is higher than the starting pressure, the pressure of the first main section drives the switch plug to move to open the first switch opening and block the second switch opening, thereby the switch channel is isolated from the oil returning channel; then the pressure of the first main section separates the switch gasket and the annular protrusion and open the first switch opening, thereby the first main section fluidly communicates with the pressurization channel;

when the pressure of the first main section lowers down to the static pressure, the switch plug moves to block the first switch opening of the switch channel, and opens the second switch opening, thereby the pressurization channel fluidly communicates with the oil returning channel.

* * * * *